United States Patent
Kulkarni et al.

(10) Patent No.: US 7,507,484 B2
(45) Date of Patent: Mar. 24, 2009

(54) BOND COAT COMPOSITIONS AND ARRANGEMENTS OF SAME CAPABLE OF SELF HEALING

(75) Inventors: Anand A. Kulkarni, Orlando, FL (US); Ramesh Subramanian, Oviedo, FL (US); Andrew J. Burns, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 11/607,343

(22) Filed: Dec. 1, 2006

(65) Prior Publication Data
US 2008/0131711 A1 Jun. 5, 2008

(51) Int. Cl.
*B32B 15/04* (2006.01)

(52) U.S. Cl. .................. 428/632; 428/633; 428/678; 416/241 R; 416/241 B

(58) Field of Classification Search .......... 428/627, 428/632, 633, 666, 660, 678, 680, 220, 332, 428/457, 472; 416/241 R, 241 B
See application file for complete search history.

(56) References Cited

U.S. PATENT DOCUMENTS

| | | | |
|---|---|---|---|
| 5,043,138 | A | 8/1991 | Darolia et al. |
| 5,499,905 | A | 3/1996 | Schmitz et al. |
| 5,712,050 | A | 1/1998 | Goldman et al. |
| 5,840,434 | A | 11/1998 | Kojima et al. |
| 5,863,668 | A | 1/1999 | Brindley et al. |
| 5,975,852 | A | 11/1999 | Nagaraj et al. |
| 5,993,980 | A | 11/1999 | Schmitz et al. |
| 6,093,454 | A | 7/2000 | Brindley et al. |
| 6,139,976 | A | 10/2000 | Czech et al. |
| 6,207,297 | B1 | 3/2001 | Sabol et al. |
| 6,435,835 | B1 | 8/2002 | Allen et al. |
| 6,482,537 | B1 | 11/2002 | Strangman et al. |
| 6,896,488 | B2 | 5/2005 | Bruce et al. |
| 6,924,040 | B2 | 8/2005 | Maloney |
| 6,979,498 | B2 | 12/2005 | Darolia et al. |
| 2002/0132132 | A1* | 9/2002 | Bose et al. ............. 428/632 |

(Continued)

FOREIGN PATENT DOCUMENTS

WO    WO 03/057944    * 7/2003

OTHER PUBLICATIONS

J.R. Nicholls, *Designing Oxidation-Resistant Coatings*, Journal of Metals, Jan. 2000, pp. 28-35, Warrendale, PA.

(Continued)

*Primary Examiner*—Jennifer McNeil
*Assistant Examiner*—Gordon R Baldwin

(57) ABSTRACT

A thermal barrier coating (TBC) system (450) capable of self-healing has a substrate (420), a metal-based advanced bond coat (435) overlying the substrate and a ceramic top coat (440) overlying the bond coat. The bond coat (435) comprises ceramic oxide precursor materials capable of forming a non-alumina ceramic oxide composition when exposed to a thermally conditioning oxidizing environment. Embodiments of such bond coat (435) comprise rare earth elements in a range of 1-20 weight percent, and Hf in a range of about 5 to 30 weight percent or Zr in a range of about 2 to 20 weight percent. Examples of self-healing TBC systems (400, 402, 404) are provided using such bond coat (435) or its advanced bond coat chemistries in combination with conventional bond coats (433, 437) or conventional bond coat chemistries.

20 Claims, 3 Drawing Sheets

U.S. PATENT DOCUMENTS

| | | |
|---|---|---|
| 2003/0211354 A1 | 11/2003 | Subramanian et al. |
| 2003/0228441 A1 | 12/2003 | Subramanian et al. |
| 2004/0048090 A1* | 3/2004 | Creech et al. ............... 428/621 |
| 2005/0170200 A1 | 8/2005 | Nagaraj et al. |
| 2005/0196635 A1 | 9/2005 | Johnson et al. |
| 2005/0244663 A1 | 11/2005 | Ulion et al. |
| 2006/0251916 A1* | 11/2006 | Arikawa et al. ............. 428/632 |

OTHER PUBLICATIONS

B.A. Pint et al., *Compositional Effects on Aluminide Oxidation performance: Objectives for Improved Bond Coats,* Sep. 2000, ASM-TMS Superalloys 2000, Seven Springs, PA.

B.A. Pint, *The Use of Two Reactive Elements to Optimize Oxidation Performance of Alumina-Forming Alloys,* Materials at High Temperatures, vol. 20, No. 3, Aug. 15, 2003, pp. 375-386(12).

* cited by examiner

BOND COAT COMPOSITIONS AND ARRANGEMENTS OF SAME CAPABLE OF SELF HEALING

FIELD OF THE INVENTION

This invention relates to novel bond coat chemistries for an advanced bond coat formulated and intended to be applied between a metallic substrate and an outwardly disposed ceramic layer (also referred to as "top coat") of a thermal barrier coating (TBC). This invention also relates to TBC systems comprising such advanced bond coat, particularly TBC systems possessing a self-healing property due to the advanced bond coat.

BACKGROUND OF THE INVENTION

Thermal Barrier Coatings (TBCs) generally comprise a two-layer system, which incorporates an outer insulative ceramic layer and an underlying oxidation-resistant metallic layer (bond coat, referred to by some in the field as a basecoat) on an external surface of metallic components. Typically, the bond coat of such TBC system itself represents a complex chemical system, identified in the art as M-Cr—Al—X, where M is nickel, cobalt or a combination of both and X is usually yttrium, but alternatively may be Si, Ta, or Hf. The alloy composition of the bond coat is selected to provide a best fit for oxidation and corrosion resistance. While nickel base alloys generally demonstrate better oxidation resistance, the cobalt base alloys provide better hot corrosion resistance. In general, these bond coats are deposited using air plasma or vacuum plasma/low pressure plasma, wire-arc, flame combustion, high velocity oxy-fuel or cold spray process, depending on operational and other requirements.

For example, a TBC system may utilize a ceramic top coat such as yttria stabilized zirconia, that is applied over the bond coat. Such ceramic top coat is typically applied by either electron beam physical vapor deposition (EB-PVD) or by plasma spray. Prior to ceramic top coat application, the surface of the bond coat is optimized to maximize adherence between the bond coat and the specific ceramic top coat used. For EB-PVD, the bond coat is usually polished and preoxidized prior to deposition of a columnar ceramic top coat, which provides a thermal barrier. In contrast, plasma sprayed ceramic top coats favor a rough bond coat surface and do not require the in-situ formation of an aluminum oxide layer prior to deposition. Plasma sprayed ceramic thermal barrier coatings rely on porosity and micro cracks to accommodate strain during service.

FIG. 1A shows a cross-sectional side view schematic of a prior art conventional TBC system 100. Conventional TBC system 100 is comprised of a substrate 120, a bond coat 130, and an outer ceramic layer 140. FIG. 1B provides a cross-sectional view of an actual prior art TBC system 100 formed with a convention bond coat chemistry, where a top portion of substrate 120 is observable, above which is disposed bond coat 130, above which is disposed outer ceramic layer 140.

Generally, upon high temperature exposure in operation, the bond coats grow a surface protective oxide layer, due to the selective oxidation of the elemental constituents in the bond coat alloy. The desired properties of this oxide layer are thermodynamic stability, slow growth and adherence. Currently, the majority of the alloys are chromia or alumina formers and the presence of relatively low concentrations of yttrium in the bond coat improves the adherence of the oxide layer formed at the bond coat/ceramic top coat boundary to the ceramic top coat. However, the oxide scale possess high thermal conductivity and low thermal expansion compared to the overall system (and particularly to the ceramic layer 140), thus increasing the residual stress at the oxide/ceramic layer interface leading to spallation.

FIG. 2 shows one such example of delamination of a prior art TBC system 200. The delamination regions 210 are observable between bond coat 230, at the more exterior edge of which is an $Al_2O_3$ layer 233, and overlaying ceramic layer 240. An upper portion of substrate 220 also is observable.

Currently, a vast amount of research is directed towards formation of continuous and more adherent surface oxide layer. For example, it is known that addition of small amounts of reactive elements promote this formation, where the alloying additions are Cr, Si, Ta, Hf and precious metals (Pt, Pd). It also has been taught, in U.S. Pat. No. 5,993,980, issued Nov. 30, 1999 to Schmitz and Czech, that certain formulations of an adhesion-promoting layer may include from 0.3 to 2.0 percent yttrium and/or at least one equivalent metal from the group including scandium and rare earth elements. An earlier reference, PCT Publication number WO/89/07159, cited in U.S. Pat. No. 5,993,980, is stated to disclose that an outer alloy of a two-layer metallic protective coating may comprise between 0.2 and 3.0 percent of at least one element from a list including yttrium and other metals, however excluding other rare earth metals.

Despite these and other formulations and approaches toward developing better TBC systems, a need remains for TBC formulations and systems that are directed to solving persistent problems with TBC systems, such as extending component life.

BRIEF DESCRIPTION OF THE DRAWINGS

The invention is explained in the following description in view of the drawings that show.

DETAILED DESCRIPTION OF THE INVENTION

Figure 1A:
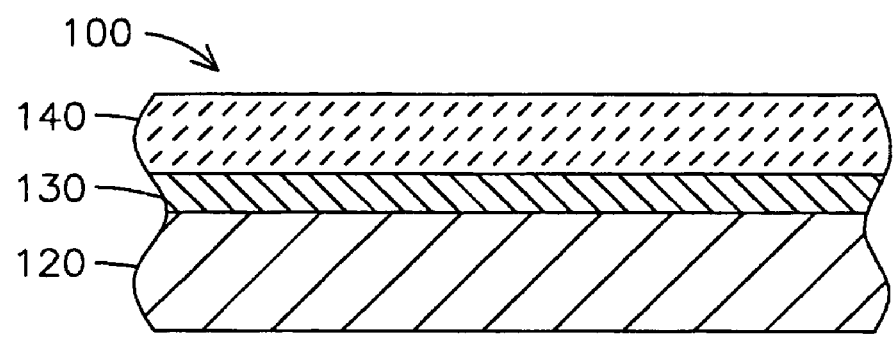
FIG. 1A is a schematic cross-sectional side view of a prior art TBC system.
Figure 1B:
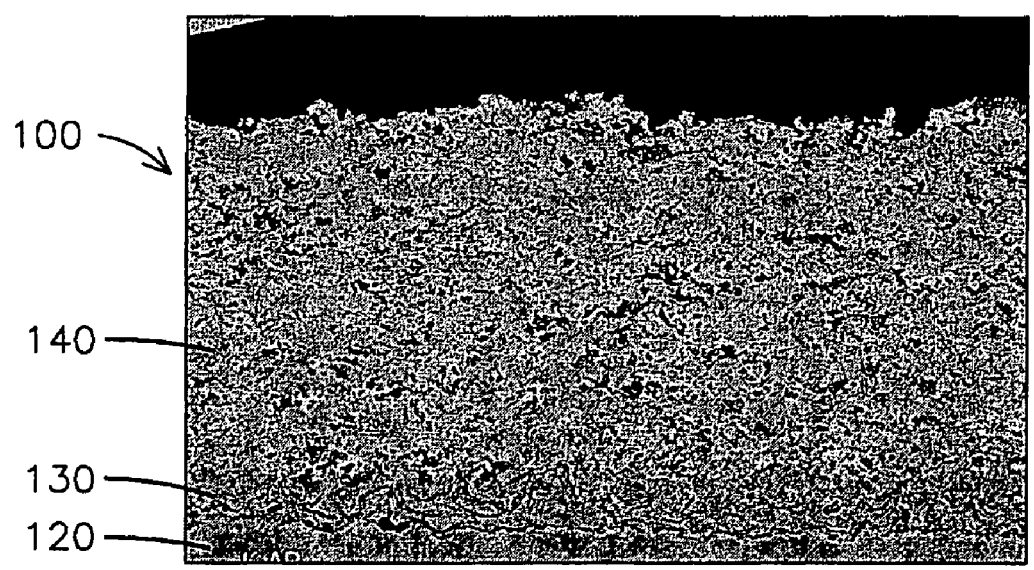
FIG. 1B is a cross-sectional side view of an actual prior art TBC system formed with a convention bond coat chemistry.
Figure 2:
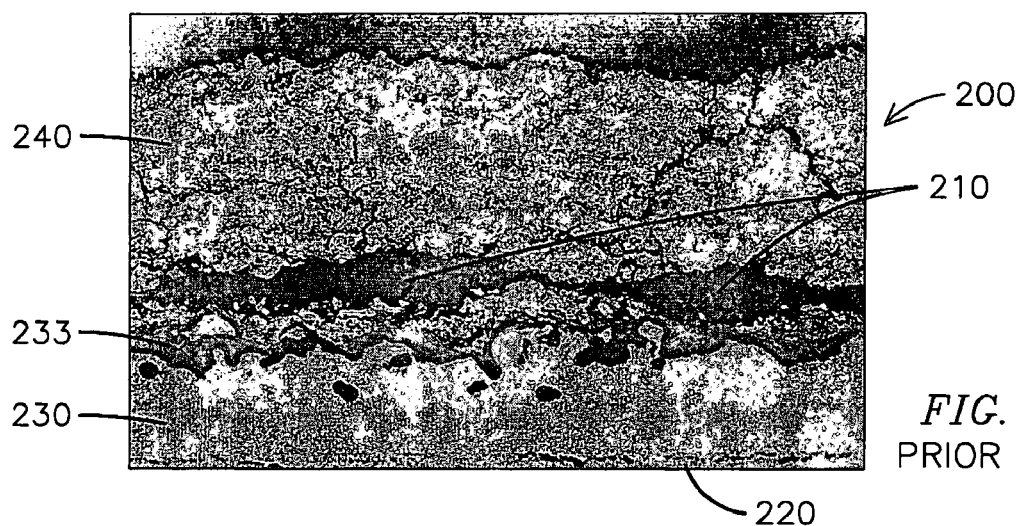
FIG. 2 is a representation of a photomicrograph cross-sectional side view of a prior art TBC system that demonstrates delamination.

While adhesion properties are desired in some of the above-discussed research efforts, the present approach modifies the bond coat compositions sufficiently to promote selective oxidation of ceramic top coat-like chemistries upon a thermal conditioning, i.e., exposure to a sufficiently elevated temperature for a sufficient period of time. This approach takes advantage of low thermal conductivity non-alumina thermally grown oxides that advantageously have thermal expansion coefficients comparable to the ceramic top coat. This closer matching of thermal conductivity and thermal expansion thus reduces the stress levels generated at this boundary compared to the case of alumina or chromia formation.

The bond coat chemistries have been modified by reducing the aluminum concentration by adding one or more rare earth elements at relatively high weight percentages as described herein, and also by adding at least one of Zr and Hf. Without being bound to a particular theory, relatively higher levels of rare earth elements, whether yttrium and/or others, that are present in the bond coat are believed to form thermally insulating ceramic oxide compositions when sufficient Zr or Hf also are present, for example $Gd_2O_3$—$ZrO_2$, $Gd_2O_3$—$HfO_2$, $Y_2O_3$—$ZrO_2$, $Y_2O_3$—$HfO_2$, etc. Thus, the new, advanced bond coat chemistries are seen to have the capability to provide alternative oxide compositions upon heating, such as during high temperature operations for a turbine engine component comprising the TBC system.

Advantageously, these alternative oxide compositions have the potential to provide self-healing surface layers that may prevent or advantageously delay catastrophic failure of a turbine engine component by forming a ceramic-like layer in the bond coat to prevent 'burn-through' after a portion of the ceramic layer of the TBC system has been lost, such as due to spalling or other wear or impact-related loss.

It is noted that as used herein, the term "rare earth elements" is taken to mean the elements cerium (Ce), dysprosium (Dy), erbium (Er), europium (Eu), gadolinium (Gd), holmium (Ho), lanthanum (La), lutetium (Lu), neodymium (Nd), praseodymium (Pr), samarium (Sm), terbium (Tb), thulium (Tm), ytterbium (Yb), and yttrium (Y). It is noted that other definitions used by some in the art may include other non-lanthanide series elements besides yttrium, and may also include promethium, a lanthanide series element that is not found naturally in the earth's crust. However, for purposes of this application, including the claims, the above-identified elements are taken to be the group of elements identified by the term "rare earth elements." The discussion and use in examples of Y and Gd are not meant to be limiting of the scope of the present invention.

As to the aforementioned relatively high weight percentages of rare earth elements in advanced bond coat formulations of embodiments of the present invention, the following table, Table 1 provides ranges for such rare earth elements as well as for other major constituents in such formulations.

TABLE 1

Self-healing Advanced Bond Coat Formulations Summary

| System Code | % Co | % Ni | % Cr | % Al | % Y | % other elements |
|---|---|---|---|---|---|---|
| A | 25-35 | 20-30 | 13-20 | 5-8 | 1-7 | 5-28 Hf |
| B | 29-38 | 24-31 | 16-20 | 6-8 | 1-7 | 2-16 Zr |
| C | 27-37 | 23-31 | 15-20 | 5-8 | 0.2-1 | 2-13 Gd, 2-15 Zr |
| D | 24-36 | 20-30 | 13-20 | 5-8 | 0.2-1 | 2-12 Gd, 5-26 Hf |
| E | 24-38 | 20-32 | 11-20 | 5-8 | 1-20 | total REE; 2-20 Zr or 5-30 Hf |

It is noted that various rare earth elements may be substituted in the systems of Table 1 for either the Y in Systems A and B or the Gd in Systems C and D. Toward this end, and to further summarize the formulations effective to form "advanced bond coats" as that term is used herein, System Code E provides a generalized formula. In this generalized formula "1-20 total REE" indicates that between about one and about 20 weight percent of a particular formulation is comprised of one or more of the rare earth elements. Further as to generalized formula E, at least one of Zr or Hf are to be added in the respective indicated ranges. Without being bound to a particular theory, it is expected that a formulation containing both Zr and Hf in more than minor concentrations may result in non-productive competition for oxide formation, and would not be cost-effective. However, the formulation calls for at least one of Zr or Hf in the indicated respective ranges, and the addition of the other in a particular formulation, so that both are present, is meant to nonetheless fall within the scope of the present teachings. One of Zr or Hf is to be present in the indicated concentration ranges so that a sufficient quantity of these elements is available in the advanced bond coat layer to provide for formation of the complex ceramic oxides described herein. For example, at least 2 weight percent of Zr, or at least 5 weight percent of Hf, is present in certain advanced bond coat embodiments of the present invention.

Further to the information in Table 1 and to information generally known in the art, the following nomenclature is adopted to identify and distinguish the bond coat compositions. As used herein, the term "conventional bond coat" is taken to mean a bond coat having a chemistry that is normally capable of forming, without mixing or juxtaposition with an "advanced bond coat," an aluminum oxide boundary layer toward a more outwardly disposed ceramic layer when subjected to sufficient heating such as during high temperature gas turbine operations. A representative conventional bond coat may use a M-Cr—Al—X complex chemistry, where M is nickel cobalt or a combination of both, Cr is present in a weight percent of about 15 to 25, X is Y, Si, Ta, and/or Hf present in a total weight percentage not exceeding about 2, and the Al is present in a weight percent ranging from about 7 to about 15 percent. As but one example of a particular class of M-Cr—Al—X alloy, a CoNiCrAlY alloy may be comprised of 35-40% Co, 30-35% Ni, 20-25% Cr, 5-10% Al, and 0.1-2% Y. As noted above, the exact alloy composition of a conventional bond coat may be selected to provide a best fit for oxidation and corrosion resistance in a particular application. While Nickel base alloys generally demonstrate better oxidation resistance, the cobalt base alloys provide better hot corrosion resistance.

Further, as used herein, an "advanced bond coat" of the present invention has a metal based chemistry as does the "conventional bond coat." However, an "advanced bond coat" has a chemistry modified in accordance with the representative formulation ranges provided in Table 1 (recognizing that Y and Gd are mere examples of any rare earth metals) so that it has a lower weight percent of Al, in a range of about 5 to about 8 percent, one or more rare earth elements in a general range of about 1 to about 20 weight percent for all such rare earth elements, and Zr or Hf present in a range of about 2-20 weight percent for Zr and about 5-30 weight percent for Hf. It is noted that various embodiments of "advanced bond coat" as described herein may alternatively be referred to as "self-healing bond coat" owing to their property of being disposed to form a ceramic mass upon sufficient exposure to heat and oxygen, wherein the ceramic mass has thermal conductivity and expansion properties substantially close to those properties of a ceramic layer that may overlay an advanced bond coat layer. In various embodiments, the ceramic oxide that forms on high temperature exposure of the advanced bond coat may have a thermal conductivity within ten percent, or alternatively within twenty percent, of the thermal conductivity of the top ceramic TBC layer.

Upon sufficient exposure to heat, System A forms a low thermal conductivity $Y_2O_3$—$HfO_2$ composition. Similarly, upon sufficient exposure to heat, System B forms a low thermal conductivity $Y_2O_3$—$ZrO_2$ composition, System C forms a low thermal conductivity $Gd_2O_3$—$ZrO_2$ composition, and System D forms a low thermal conductivity $Gd_2O_3$—$HfO_2$ composition. By sufficient heat exposure is meant an exposure to a temperature exceeding 900 degrees Celsius for a sufficient period of time to form such ceramic oxides. As is generally recognized by those skilled in the art, heat exposure over time of operation of a device such as a gas turbine engine tends to provide such exposure, and these oxides form faster at higher temperatures than at lower temperatures. Under such heat exposure conditions, where oxygen is present in the surrounding atmosphere, it is appreciated that an oxidizing atmosphere to which the material is exposed provides the needed heat and oxygen to support the formation of such ceramic oxides in advanced bond coat embodiments of the present invention.

Upon formation of embodiments of advanced bond coats as described herein, the thermal conductivity of the non-alumina ceramic oxide composition formed may be relatively close to the thermal conductivity of a ceramic layer such as may overlie the respective advanced bond coat. As noted above, one benefit of such relatively similar thermal conductivity is a lower tendency to spall. Another benefit is a 'self-healing' characteristic in that if a portion of a ceramic layer falls away or otherwise is removed, leaving an exposed region of an advanced bond coat, that region of the advanced bond coat, being exposed to greater heat per unit time, would form a relatively low thermal conductivity ceramic-like region (e.g., see FIG. 3B and FIGS. 4A-4C). This is effective for extending component life by delaying burn-through and component failure. As used herein, there terms "self-healing" and self-heal" relate to formation of ceramic-like compositions (the latter term taken to comprise ceramic compositions) having thermal conductivities in the ranges described in the following paragraphs.

The above example of a self-healing region is not meant to be exclusive. Formation of a ceramic-like composition in an advanced bond coat occurs over time as a function of heat exposure (and other factors). Thus, ceramic-like areas within an advanced bond coat are not limited to specific regions that are exposed through removal of a previously overlying ceramic layer. As to the thermal conductivity of advanced bond coats upon formation of ceramic-like areas or regions, the thermal conductivity of the non-alumina ceramic oxide composition formed may be between about 0.2 and 1.2 W/m° K. More particularly, the thermal conductivity of certain non-alumina ceramic oxide composition formed may be between about 0.4 and 0.8 W/m° K. These ranges are inclusive of the end-points and are not meant to be limiting.

Advanced bond coat layer embodiments also have a property of having a Coefficient of Thermal Expansion (CTE) that is closer to the CTE of the outer ceramic top coat. For example, and not to be limiting, some non-alumina ceramic oxide composition formed have a CTE greater than 8 μm/m° C.

Recognizing that Y and Gd are members of the group of rare earth elements as defined herein, it is appreciated that any of the rare earth elements may be substituted, singly or through use of combinations, for either Y or Gd in the formulations provided in Table 1. For example, and not to be limiting, the following Table 2 provides several examples of suitable formulations that produce advanced bond coats in accordance with the teachings of the present invention.

TABLE 2

Specific Advanced Bond Coat Formulations

| System Code | % Co | % Ni | % Cr | % Al | Other: |
|---|---|---|---|---|---|
| F | 33 | 28 | 18 | 7 | Ce = 4%; Hf = 10% |
| G | 35 | 29 | 19 | 7 | Nd = 4%; Z = 6% |
| H | 28 | 23 | 15 | 6 | Lu = 9%; Hf = 18% |
| I | 28 | 24 | 15 | 6 | Tb = 8%; Hf = 19% |
| J | 28 | 23 | 15 | 6 | Ho = 13%; Z = 15% |

It is noted that an Al range of 5-8 percent is not meant to be limiting for all embodiments, and may be higher or lower so long as the advanced bond coat formulation is effective for providing sufficient concentrations of rare earth elements and Hf and/or Z to form ceramic oxides rather than an alumina boundary layer upon thermal conditioning. Further, as to the stated range for rare earth elements (see above, e.g., System Code E of Table 1), that range of 1-20 weight percent is taken to represent the range stated, and also to indicate the inclusion herein of all narrower ranges that include all integers respectively included therein, and including the stated end points. For example, a range of rare earth elements for particular embodiments covered by this disclosure is between 3 and 20 weight percent, between 4 and 20 weight percent, between 3 and 19 weight percent, between 4 and 19 weight percent, and so forth for all integers including and between the end points, 1 and 20, of the stated range. Stated another way, the upper limit of a nested range of all nested ranges may be reduced in increments of integers within the stated range, and the lower limit of a nested range of all nested ranges may be increased in increments of integers within the stated range. In various embodiments, this sub-ranging also applies to the stated range of 2-20 weight percent for Zr and to the stated range of 5-30 weight percent for Hf.

EXAMPLE 1

Four specific advanced bond coat formulations, shown in Table 3 below, were prepared using the following protocol: The powder chemistries were specified based on the desired range to obtain the ceramic compositions. The powder was manufactured using gas atomization technique to achieve uniform chemistry of the powder. These powders were further deposited using thermal spraying. The samples were heat treated to temperatures beyond 900° C. to evaluate the oxidation characteristics. All of these specific formulations demonstrated the formation of low conductivity oxide compositions such as are described above for the respective general formulation ranges of Systems A-E.

TABLE 3

Four Specific Advanced Bond Coat Formulations

| System Code | % Co | % Ni | % Cr | % Al | % Y | % other elements |
|---|---|---|---|---|---|---|
| K | 33.33 | 28.02 | 18.27 | 6.96 | 2.99 | 10.43 Hf |
| L | 35.12 | 29.52 | 19.25 | 7.33 | 3.15 | 5.62 Zr |
| M | 34.4 | 28.92 | 18.86 | 7.19 | 0.45 | 4.67 Gd, 5.5 Zr |
| N | 32.68 | 27.48 | 17.92 | 6.83 | 0.43 | 4.44 Gd, 10.23 Hf |

Figure 3A:
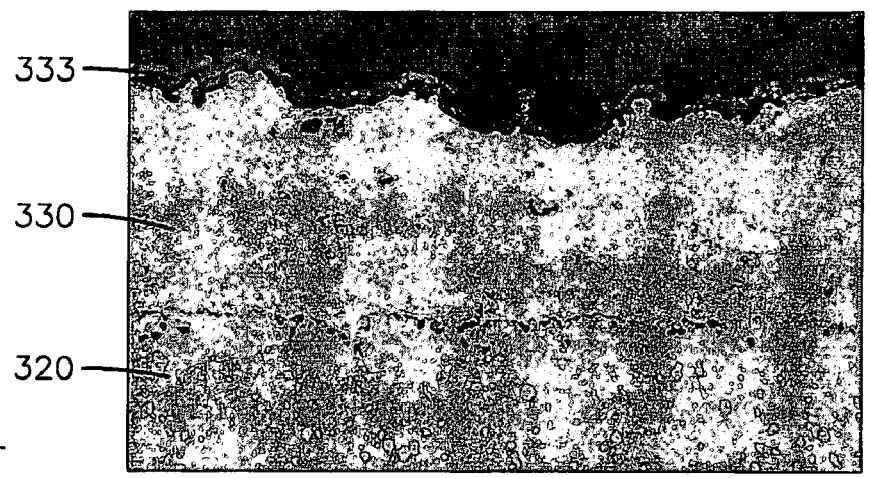
FIG. 3A is a representation of a photomicrograph cross-sectional side view of a prior art TBC system that shows an alumina layer formed after exposure to oxidizing conditions.
Figure 3B:
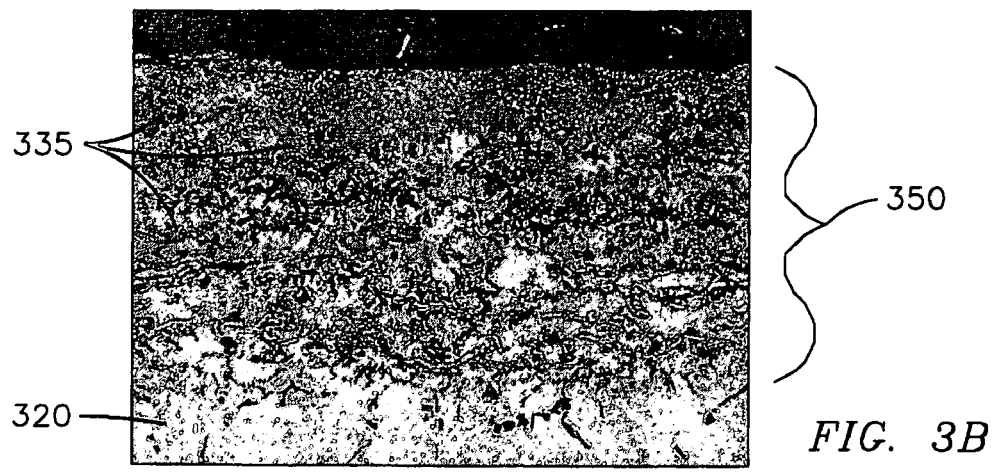
FIG. 3B is a representation of a photomicrograph cross-sectional side view of a TBC system of the present invention that shows ceramic oxide formations.

Photomicrographs of cross sections of a control and K formulation of Table 3 are shown respectively in FIGS. 3A and 3B. FIG. 3A depicts a photomicrograph of a prior art conventional bond coat chemistry after exposure to a thermally conditioning oxidizing environment. An adherent $Al_2O_3$ layer 333 is observable adjacent the bond coat 330, which overlays the substrate 320.

FIG. 3B depicts a photomicrograph of a successful ceramic-like oxide formation based on the modified chemistries of the advanced bond coat. In particular, this photomicrograph is taken of a sample produced using the formulation of System Code K of Table 3 by methods described above. Ceramic oxides, some of which are identified by 335, formed preferentially to an $Al_2O_3$ layer, and are observed dispersed throughout advanced bond coat 350. Notably in this example the ceramic oxides, such as identified by 335, formed more densely toward the surface. This successful ceramic-oxide formation was appreciated by the inventors to lend itself to a number of novel, useful, and advantageous configurations and architectures for various TBC system embodiments. Also viewable in FIG. 3B is a top portion of a substrate 320.

Figure 4A:
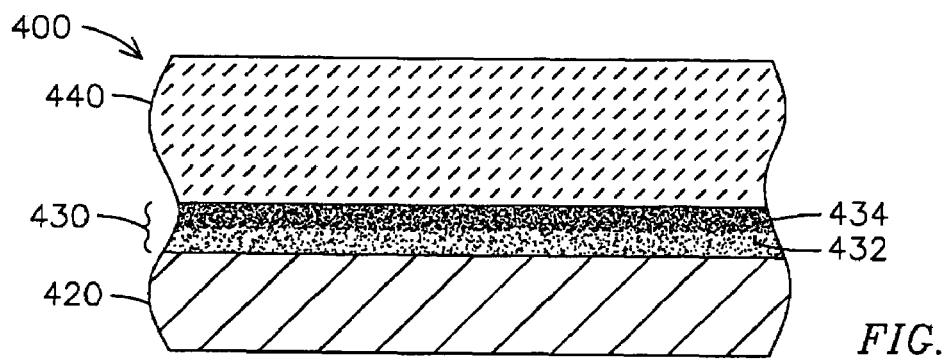
FIGS. 4A-4D provide graphical side view representations of bond coat layering alternatives of the present invention.
Figure 4B:
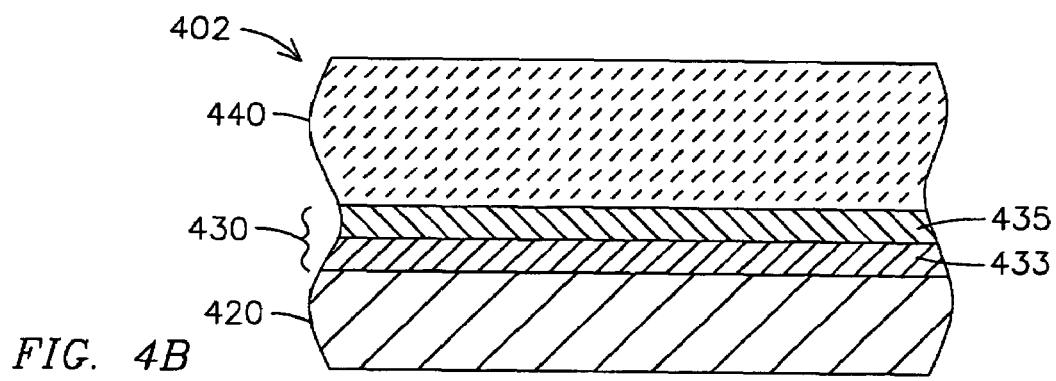
Figure 4C:
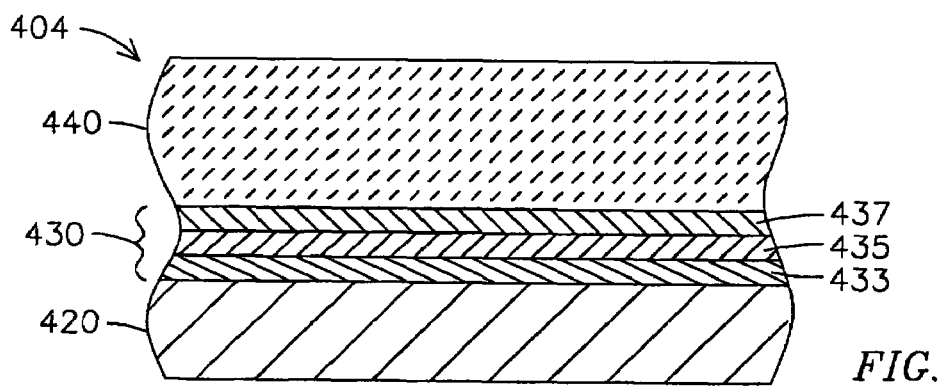

As noted above, the invention also pertains to arrangements of advanced bond coats and advanced bond coat chemistries as part of TBC systems. More particularly, three examples of advantageously designed self-healing advanced bond coat configurations in TBC systems, not meant to be limiting, are shown in FIGS. 4A-4C. Depending on the TBC system desired and the application environment, the new chemistries are deposited as single layer bond coat, a layer on top of the current bond coat that is a alumina/chromia former, a compositional gradient bond coat transitioning from old to new chemistry, a new bond coat powder dispersed in the current bond coat chemistry or the new chemistry in between two layers of old chemistry bond coats. In all these cases, the thermally grown oxide formed reduces the stress, possesses low thermal conductivity and hence confers the advantage of aiding in prolonging the life of the component.

FIG. 4A provides a cross-sectional side view schematic of a TBC system 400. TBC system 400 is comprised of a substrate 420, a bond coat 430, and a ceramic layer 440 with one overlying the other. Bond coat 430 is applied by application methods discussed herein such that a first bond coat portion 432 is applied using conventional bond coat chemistry, i.e. comprising the higher levels of aluminum. Toward the end of deposition of the first bond coat portion 432, a smooth transitioning is provided from application of this conventional, more aluminum rich chemistry, to application of the advanced bond coat chemistry described herein, such that as the layer becomes thicker toward its final thickness, the advanced bond coat is deposited. This is identified in FIG. 4A as a second bond coat portion 434. Finally, a ceramic layer 440 is applied over the bond coat 430 so that the ceramic layer 440 directly overlays the second, advanced bond coat portion 434 of bond coat 430. An advantage of the embodiment as depicted in FIG. 4A is that greater adhesion to the substrate is provided by the older chemistry of the conventional bond coat and the new chemistry of the advanced bond coat in second portion 434, directly associated with ceramic layer 440, provides for a less severe and disruptive transition between the ceramic coat 440 and the bond coat 430 with regard to coefficient of thermal expansion and thermal conductivity.

FIG. 4B also is a cross-sectional side view schematic representation of a TBC system 402 similarly comprises a substrate layer 420, a ceramic layer 440, and a bond coat 430 between these. However, here the bond coat 430 is comprised of a first layer 433 and a second layer 435. The first layer 433 is applied using the more conventional chemistry for metal based bond coat chemistries, such described above, which has a relatively higher aluminum concentration than the newer bond coat chemistries disclosed herein. Bond coat layer 435 which is applied atop bond coat layer 433 is comprised of the newer bond coat chemistries disclosed herein. Thus, there is not a smooth transitioning of chemistries, but rather a distinct transition between the two bond coat layers 433 and 435. However, similar to the advantage of the FIG. 4A embodiment, this embodiment provides for greater adhesion of the bond coat to the substrate 420 and also a more robust transition between the ceramic layer 440 and the new chemistry layer 435 of bond coat 430.

FIG. 4C depicts a third embodiment in which multiple layers of a bond coat are provided. A TBC system 404 comprises a substrate 420, a ceramic layer 440, and a bond coat 430 disposed there between, wherein the bond coat 430 comprises a first old (conventional) chemistry layer 433 directly overlying substrate 420, a new chemistry advanced bond coat layer 435 directly overlaying bond coat layer 433 and an old (conventional) chemistry bond coat layer 437 directly overlying bond coat layer 435. As depicted in FIG. 4C the ceramic layer 440 is applied directly atop bond coat layer 437. This embodiment is particularly adapted for a self-healing capability in that if a portion of the ceramic layer 440 during operation spalls or is otherwise inadvertently removed from the TBC system 404, at first bond coat layer 437 may thereby be exposed to high operating temperatures. While not being bound to a particular theory, it is expected that the high temperatures of operation would quickly degrade and remove and result in loss of that exposed portion of bond coat layer 437. During and after this period of operation, during which the portion of bond coat layer 437 is lost, bond coat layer 435 with the new chemistries disclosed herein forms a TBC-like ceramic oxide that provides additional and longer lasting protection to compensate for loss of the spalled or otherwise removed ceramic layer 440. This self-healing aspect thus would allow a component comprising such TBC system 404 to avoid a catastrophic failure that would otherwise result, but for the multi-layer approach to a bond coat such as is depicted in FIG. 4C.

Figure 4D:
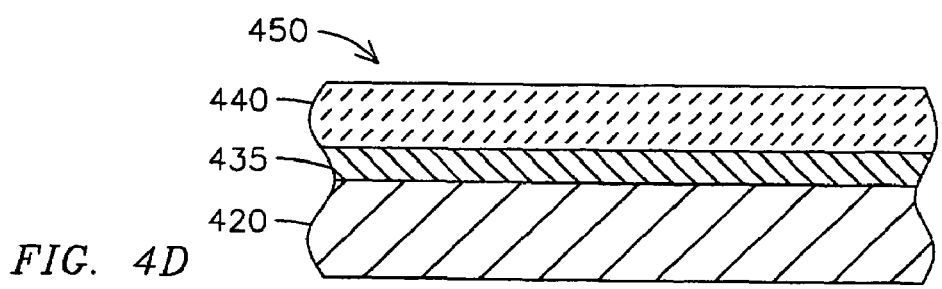

FIG. 4D is provided to schematically depict a basic self-healing TBC embodiment of the present invention. Here, a TBC system 450 that capable of self-healing has a substrate 420, a metal-based advanced bond coat 435 overlying the substrate, and a ceramic top coat 440 overlying the bond coat. This figure is meant to indicate that the self-healing aspect may be provided in simple configurations as well as in more complex arrangements, only three of which are presented above in FIGS. 4A-4C.

In general, both the conventional and the advanced bond coats are deposited using air plasma or vacuum plasma/low pressure plasma, wire-arc, flame combustion, high velocity oxy-fuel or cold spray process, depending on the operational requirements. Also, it is noted that any known method of forming powders for use in base coat applications may be used. For example, not to be limiting, a base coat powder may be prepared by gas atomization of the components, including the rare earth element(s), to obtain relatively uniform chemistry of the powder particles, which then are deposited or otherwise applied onto a substrate by methods indicated herein.

It is noted that embodiments of the present invention may include components for turbines, such as gas turbine engines, and for aircraft engines, as well as for any other device having a need for a component comprising a thermal barrier system having an advanced bond coat effective to provide increased protection and durability as described herein.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A thermal barrier coating (TBC) system comprising:
   a substrate;
   a metal-based bond coat overlying the substrate; and
   a ceramic top coat overlying the metal-based bond coat;
   wherein the metal-based bond coat comprises ceramic oxide precursor materials that, after heating the metal-based bond coat to over 900 degrees Celsius in an oxidizing atmosphere, form a non-alumina ceramic oxide layer toward a surface directly associated with the ceramic top coat, the non-alumina ceramic oxide layer comprising a thermal conductivity coefficient between 0.2 and 1.2 W/m° K.

2. The TBC system of claim 1, wherein the thermal conductivity coefficient of the non-alumina ceramic oxide layer is between 0.4 and 0.8 W/m° K.

3. The TBC system of claim 1, wherein the metal-based bond coat comprises between about 5 and about 30 weight percent hafnium, or between about 2 and about 30 weight percent zirconium as the ceramic oxide precursor materials.

4. The TBC system of claim 3, wherein the ceramic oxide precursor materials additionally comprise one or more rare earth elements selected from the group consisting of cerium, dysprosium, erbium, europium, gadolinium, holmium, lanthanum, lutetium, neodymium, praseodymium, samarium, terbium, thulium ytterbium, and yttrium, the one or more rare earth elements capable of forming the non-alumina ceramic oxide layer with the hafnium or the zirconium.

5. The TBC system of claim 4 wherein the total weight percent in the metal-based bond coat of the one or more rare earth elements is between about one and about twenty percent.

6. The TBC system of claim 4 wherein the total weight percent in the metal-based bond coat of the one or more rare earth elements is greater than three to about twenty percent.

7. The TBC system of claim 1, wherein the metal-based bond coat comprises
between about 5 and about 30 weight percent hafnium, or between about 2 and about 20 weight percent zirconium; and
one or more rare earth elements selected from the group consisting of cerium, dysprosium, erbium, europium, gadolinium, holmium, lanthanum, lutetium, neodymium, praseodymium, samarium, terbium, thulium, ytterbium, and yttrium;
wherein the one or more rare earth elements is/are capable of forming the ceramic oxide layer that comprises oxides of zirconium or hafnium.

8. The TBC system of claim 1, wherein the metal-based bond coat comprises yttrium at a concentration between 1 and 20 weight percent of a NiCrAlY, a CoCrAlY or a CoNiCrAlY composition that comprises the metal-based bond coat.

9. The TBC system of claim 1, wherein the non-alumina ceramic oxide layer has a Coefficient of Thermal Expansion (CTE) greater than 8 μm/m° C.

10. A thermal barrier coating (TBC) system comprising:
a substrate;
a metal-based bond coat overlying the substrate; and
a ceramic top coat;
the metal-based bond coat comprising ceramic oxide precursor materials that, after heating the metal-based bond coat to over 900 degrees Celsius in an oxidizing atmosphere, form a non-alumina ceramic oxide layer toward a surface directly associated with the ceramic top coat and,
the metal-based bond coat comprising: Co, 24-38 weight percent; Ni, 20-32 weight percent; Cr, 11-20 weight percent; Al, 5-7 weight percent; one or more rare earth elements totaling 2.99-20 weight percent; and at least one of Hf, at 9-30 weight percent, and Zr, at 2-20 weight percent,
wherein the non-alumina ceramic oxide layer comprises Hf or Zr.

11. The TBC system of claim 10, wherein the thermal conductivity coefficient of the non-alumina ceramic oxide layer is between 0.2 and 1.2 W/m° K.

12. The TBC system of claim 10, wherein the thermal conductivity coefficient of the non-alumina ceramic oxide layer is between 0.4 and 0.8 W/m° K.

13. The TBC system of claim 10, wherein the non-alumina ceramic oxide layer has a Coefficient of Thermal Expansion (CTE) greater than about 8 μm/m° C.

14. A thermal barrier coating (TBC) system comprising:
a substrate;
a first advanced bond coat overlying the substrate; and
a ceramic top coat overlying the first advanced bond coat;
wherein the first advanced bond coat comprises ceramic oxide precursor materials capable of forming a non-alumina ceramic oxide layer when exposed to an oxidizing atmosphere at over 900 degrees Celsius, effective to self-heal the TBC system upon a loss of a region of the overlying ceramic top coat.

15. The TBC system of claim 14, wherein the first advanced bond coat comprises the elements: Co, 24-38 weight percent; Ni, 20-32 weight percent; Cr, 11-20 weight percent; Al, 5-7 weight percent; one or more rare earth elements totaling 2.99-20 weight percent; and at least one of Hf, at 9-30 weight percent, and Zr, at 2-20 weight percent.

16. The TBC system of claim 14, wherein a transitioning bond coat comprises a gradient transitioning from a bond coat region that forms alumina or chromia and that overlies the substrate to the first advanced bond coat directly adjacent the ceramic top coat.

17. The TBC system of claim 14, comprising a first bond coat layer that forms alumina or chromia and that overlies the substrate, and the first advanced bond coat overlying the first bond coat layer.

18. The TBC system of claim 17, wherein the first bond coat layer comprises a composition adapted to form an alumina or a chromia layer when exposed to over 900 degrees Celsius.

19. The TBC system of claim 14, wherein a multi-layer bond coat comprises:
a first bond coat layer overlying the substrate, comprising a composition adapted to form an alumina or a chromia layer when exposed to over 900 degrees Celsius;
the first advanced bond coat overlying the first bond coat layer; and
a second bond coat layer overlying the first advanced bond coat, comprising a composition adapted to form an alumina or a chromia layer when exposed to over 900 degrees Celsius.

20. The TBC system of claim 15, wherein the elements of the first advanced bond coat are provided over the substrate from a powder prepared by gas atomization.

* * * * *